(12) United States Patent
Berg et al.

(10) Patent No.: US 10,069,160 B2
(45) Date of Patent: Sep. 4, 2018

(54) STACK VOLTAGE CONTROL FOR RECOVERY MODE USING BOOST CONVERTER

(71) Applicant: GM GLOBAL TECHNOLOGY OPERATIONS LLC, Detroit, MI (US)

(72) Inventors: Joseph Berg, West Bloomfield, MI (US); Jun Cai, Fairport, NY (US); Sergio E. Garcia, Commerce Township, MI (US); Daniel W. Smith, Shelby Township, MI (US); Matthew C. Kirklin, Coleman, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 118 days.

(21) Appl. No.: 15/221,024

(22) Filed: Jul. 27, 2016

(65) Prior Publication Data

US 2018/0034077 A1 Feb. 1, 2018

(51) Int. Cl.
*H01M 8/04828* (2016.01)
*H01M 8/24* (2016.01)
*B60L 11/18* (2006.01)
*H01M 8/04858* (2016.01)

(52) U.S. Cl.
CPC ....... *H01M 8/0488* (2013.01); *B60L 11/1883* (2013.01); *H01M 8/24* (2013.01); *H01M 2250/20* (2013.01)

(58) Field of Classification Search
CPC combination set(s) only.
See application file for complete search history.

(56) References Cited

U.S. PATENT DOCUMENTS

2010/0078997 A1* 4/2010 Chen .................. B60L 1/00
307/31

* cited by examiner

*Primary Examiner* — Carlos Barcena
(74) *Attorney, Agent, or Firm* — Reising Ethington P.C.

(57) ABSTRACT

A fuel cell voltage recovery system includes a fuel cell stack having a fuel cell stack voltage between fuel cell stack terminals which is at a first voltage during normal fuel cell operation. The system also includes a high voltage electrical system operating at a first DC operating voltage that is generally higher than the first voltage of the fuel cell stack. A boost converter in electrical connection with the fuel cell stack and the high voltage electrical system operates in a normal control mode to transfer electrical power from the fuel cell stack to the high voltage electrical system through regulation and control of average stack output current (boost input current) during normal fuel cell operation. The boost converter can also operate in a voltage control mode to lower the fuel cell stack voltage to a second voltage that is lower than the first voltage. A FCS controller controls the operation of the boost converter.

18 Claims, 4 Drawing Sheets

STACK VOLTAGE CONTROL FOR RECOVERY MODE USING BOOST CONVERTER

TECHNICAL FIELD

In at least one aspect, the present invention is related to voltage control of a fuel cell stack to be used in a voltage recovery mode.

BACKGROUND

Fuel cell stacks are used as an electrical power source in many applications. In particular, fuel cell stacks are proposed for use in automobiles to replace internal combustion engines. In typical applications, fuel cell stacks are provided in arrays of many individual fuel cells in order to provide high levels of electrical power. As the fuel cell stack is used, an undesirable drop in the stack output voltage is observed. It has been found that this voltage drop can be reversed by operating the fuel cell stack under wet conditions at a low voltage (i.e., at or below 30 V).

Several strategies have been devised for operating a fuel cell stack under low voltage conditions. In one prior art method, low voltage is achieved by running the fuel cell cathode at a low stoichiometry with accurate control of cathode valve positions to prevent the voltage from crashing. Another prior art method uses both a voltage suppression algorithm to bring down the voltage and a voltage limitation algorithm to keep the voltage from crashing. However, both strategies are proven to be ineffective to reach an aggressive cell voltage recovery target of below 300 mV per cell due to the hardware limitation, cell-to-cell variation, CAN signal transmission latency, and the like.

Accordingly, there is a need for fuel cell recovery systems that can maintain a fuel cell stack at a voltage that is useful for performing an effective voltage recovery.

SUMMARY

The present invention solves one or more problems of the prior art by providing in at least one embodiment, a fuel cell recovery system that can transition a fuel cell stack to a low voltage so that a stack voltage recovery operation can be implemented. The fuel cell recovery system includes a fuel cell stack having a fuel cell stack voltage between fuel cell stack terminals which is at a first voltage during normal fuel cell operation. The system also includes a high voltage electrical system operating at a first DC operating voltage that is higher than the first voltage of the fuel cell stack. A boost converter in electrical connection with the fuel cell stack and the high voltage electrical system operates in a normal control mode to transfer electrical power from the fuel cell stack to the high voltage electrical system through the regulation and control of average stack output current (boost input current) during normal fuel cell operation. The boost converter can also operate in a voltage control mode to lower the fuel cell stack voltage to a second voltage that is lower than the first voltage. A Fuel Cell System (FCS) controller is operable to send control signals to the boost converter to select normal operation and the voltage control mode. Characteristically, during the voltage control mode (also referred to as stack voltage recovery operation mode), the microprocessor of the boost converter changes to controlling duty cycle to regulate the stack output voltage (boost input voltage).

In another embodiment, a fuel cell recovery system is provided. The Fuel cell recovery system includes a fuel cell stack having a fuel cell stack voltage between fuel check stack terminals which is at a first voltage during normal fuel cell operation. The system also includes a high voltage electrical system operating at a first DC operating voltage that is higher than the first voltage of the fuel cell stack. A boost converter in electrical connection with the fuel cell stack and the high voltage electrical system operates in a normal control mode to transfer electrical power from the fuel cell stack to the high voltage electrical system during normal fuel cell operation. The boost converter also operates in a voltage control mode to lower the fuel cell stack voltage to a second voltage that is lower than the first voltage. During operation in voltage recovery mode, the boost converter transitions the fuel cell stack voltage to the second voltage by iteratively enforcing upper voltage limit set points that converge to the second voltage. A FCS controller is operable to send control signals to the boost converter to select the voltage control mode. The FCS controller determines and sets the upper voltage limit set points that are provided to the boost converter wherein, if an upper voltage limit set point cannot achieved by the boost converter, the upper voltage limit set point is set to a value that is achievable by and within the capabilities of the boost converter. As set forth above, during the voltage control mode (also referred to as stack voltage recovery operation mode), the microprocessor changes to controlling duty cycle to regulate the stack output voltage (boost input voltage).

DETAILED DESCRIPTION

Figure 1:
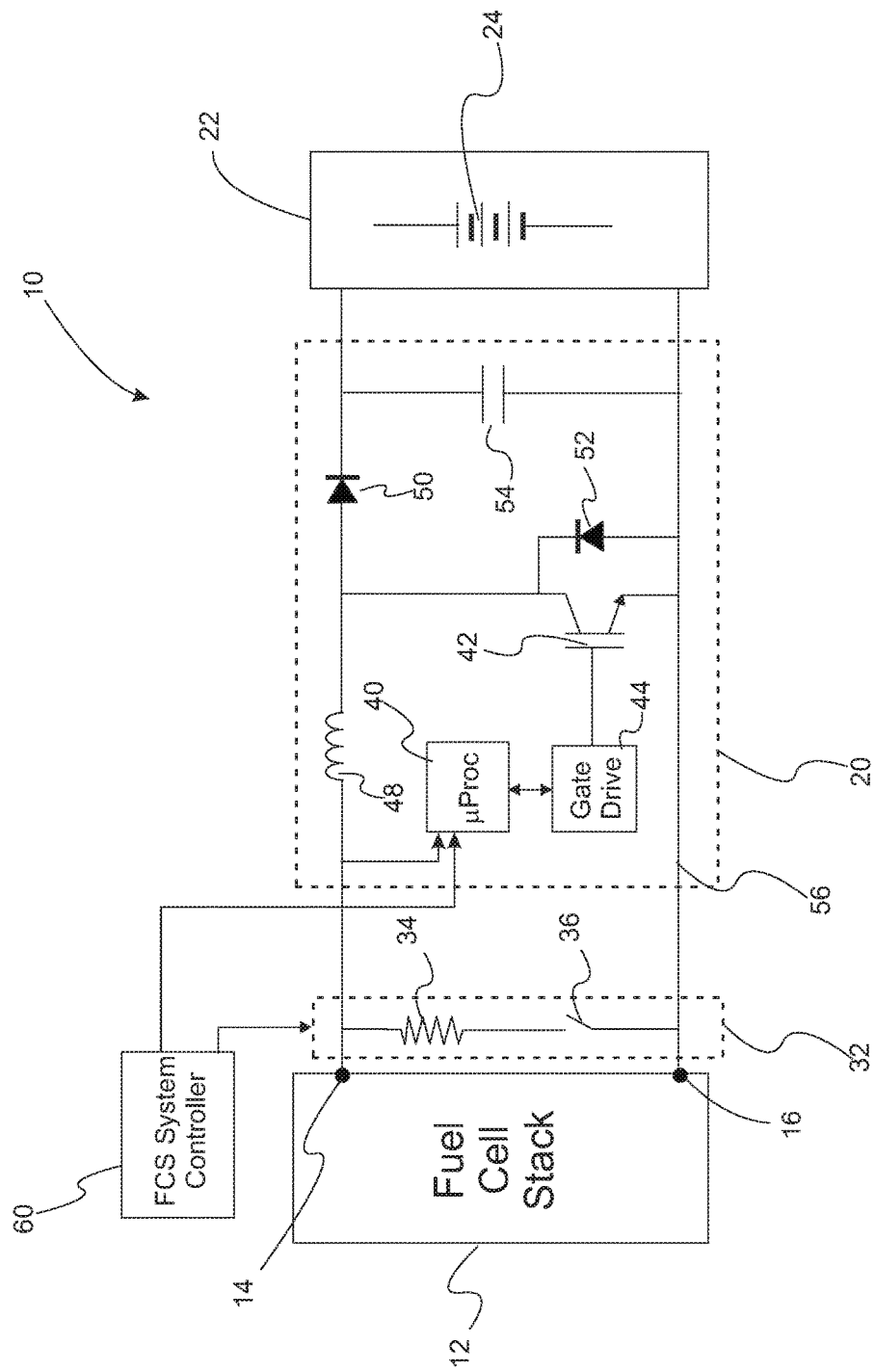
FIG. 1 is a schematic illustration of a system for implementing voltage recovery in a fuel cell stack.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

With reference to FIG. 1, a schematic illustration of a system for implementing voltage recovery in a fuel cell stack is provided. Fuel cell recovery system 10 includes fuel cell stack 12 which includes a plurality of individual fuel cells. Fuel cell stack 12 is characterized by a fuel cell stack voltage between voltage terminals 14, 16. During normal fuel cell operation, the fuel cell stack voltage is at a first voltage that is outputted to a load. In typical automotive applications, fuel cell stack includes from 20 to 350 (or more) individual fuel cells each operating at a voltage from about 0.6 to 1.22 volts per fuel cell during normal operation. Therefore, the fuel cell stack voltage can be between 12 to 430 volts. Boost converter 20 is in electrical connection with fuel cell stack 12 and high voltage system 22. High voltage system 22 operates at a first DC operating voltage. The first DC operating voltage of high voltage system 22 is higher than the first voltage which is outputted by the fuel cell stack 12. Boost converter 20 transfers electrical power from fuel cell stack 12 to the high voltage system 22 during fuel cell operation. Boost converter 20 also operates in a voltage control mode to lower the fuel cell stack voltage to a second voltage that is lower than the first voltage. Typically, at the second voltage each of the fuel cells in fuel cell stack 12 operate at a voltage from about 0.1 to 0.4 volts per fuel cell. Fuel cell recovery system 10 also includes FCS controller 60.

In a refinement, high voltage system 22 provides voltage to a vehicle in which fuel cell recovery system 10 and fuel cell stack 12 is incorporated. Typically high voltage system 22 includes high voltage battery 24.

Fuel cell recovery system 10 also includes stack discharge circuit 32 for reducing the voltage of the fuel cell stack through resistive energy discharge during other modes of operation. For this purpose, stack discharge circuit 32 includes resistor 34 and switch 36.

Still referring to FIG. 1, boost converter 20 is a modification of a standard boost used in fuel cell systems to provide electrical power from a fuel cell stack to a high voltage system. Boost converter 20 includes microprocessor 40 which controls transistor 42 via gate controller 44. Boost converter accomplishes the power transfer to the high voltage system via switch 42, inductor 48, diode 50, diode 52, and capacitor 54. The function of a boost converter is to increase the input voltage to a higher output level. This is achieved through Pulse Width Modulation control of transistor 42. During time that transistor 42 is on (TON) the current from the Fuel Cell Stack System flows through inductor 48 and transistor 42. The energy returns to fuel cell stack through wire 56 thereby creating energy stored in inductor 48 as well as a voltage rise across inductor 48. When transistor 42 transitions off the energy stored in inductor 48 causes the current to flow to the output load (i.e., high voltage system 22) and the voltage at the output of boost converter 20 is the sum of the voltage across the inductor and the stack voltage, which is higher than the initial input voltage from the fuel cell stack. In a normal fuel cell application, the boost converter microprocessor 40 controls the stack average output current (boost input current) by regulation of the duty cycle of transistor 42. However, during the voltage control mode, boost converter 20 controls a switch duty cycle (i.e., the duty cycle of transistor 42) in order to draw the proper current to remain under the upper voltage limit commanded from the FCS controller until the end of the voltage control mode.

In the present embodiment, during stack voltage recovery operation mode, the microprocessor changes from controlling duty cycle to regulate stack output voltage (i.e., boost input voltage). In a refinement, the FCS system 60 enters a wet prep operating mode when voltage recovery is triggered. Typically, the wet prep operating mode will follow the standard voltage recovery process. After sending the initial current request, the FCS controller 60 sends an upper voltage limit to the boost converter 20. The rate at which the upper voltage limit changes depends on the stack durability, i.e., how rapid a voltage change can be tolerated by the fuel cell stack without causing damage thereto. In a refinement, the rate change of the fuel cell stack effectuated by boost controller 20 is from about 0.05 to about 15 volts per second. In another refinement, the rate change of the fuel cell stack effectuated by boost controller 20 is from about 0.1 to about 8 volts per second. If this rate falls within capabilities of the boost controller 20, then the boost will honor that request. If the rate limit falls outside of the boost converter capabilities, then the boost will override the FCS request with a request that is within boost converter capabilities. Once the upper voltage limit is honored, the boost controller 20 will control switch duty cycle in order to draw the proper current to remain under the upper voltage limit until the end of the low voltage state.

FCS controller 60 is used to control boost converter 20. In this regard, the term "operable" means that FCS controller 60 either issues control signals and/or instructions to a device being controlled to perform a certain function or to return a measurement from a sensor. For example, during the operation of FCS controller 60, FCS controller issues control signals to microprocessor 40 of boost converter 20. These functions for stack FCS controller 60 are standard for many prior art systems. However, in the present embodiment FCS controller 60 allows system 10 to operate in the standard current control mode as well as a voltage control mode in which the output voltage of fuel cell stack 12 is controlled by booster control 20.

Figure 2:
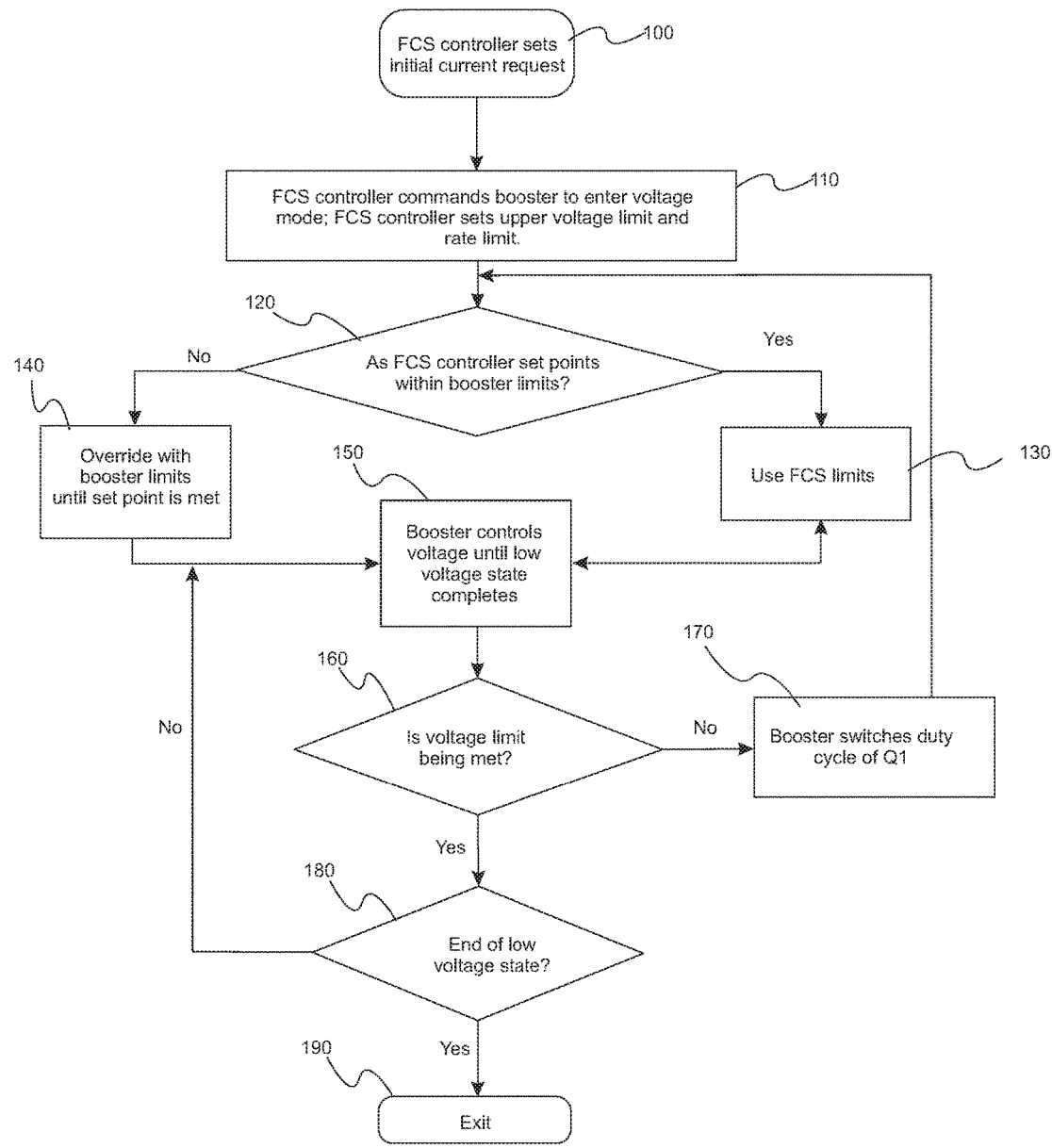
FIG. 2 is a flowchart showing the operation of fuel cell recovery system in a low voltage mode that is useful for voltage recovery.

With reference to FIGS. 1 and 2, operation of fuel cell recovery system 10 with respect to operating a fuel cell stack in the low voltage mode is provided. FIG. 2 is a flowchart showing the operation of fuel cell recovery system 10. In general, boost converter 20 transitions the fuel cell stack voltage to the second voltage value by iteratively enforcing upper voltage limit set points that converge to the second voltage, such that the boost convert transitions the fuel cell stack voltage to a value that is lower than a selected upper voltage limit set point The process begins with FCS controller 60 setting an initial current request to microprocessor 40 as depicted in block 100. This step represents the normal operation of fuel cell stack 12. In block 110, FCS controller 60 send a control signal to microprocessor 40 for boost converter 20 to enter the low voltage mode. Typically, at this time, the fuel cell recovery system 10 enters a wet prep operating mode, per the standard voltage recovery process. At this time, FCS controller 60 also sends the upper voltage limit set point and the voltage change rate limit set point to boost converter 20. The voltage change rate limit set point is the rate by which the voltage of fuel cell stack 12 can change. In block 120, FCS controller 60 and/or microprocessor 40 determines if the set points are within the specifications of the boost converter. If the set points are within the booster limits, the limits set by FCS controller 60 these limits are used (block 130). If the set points are not within the booster capabilities, the booster limits based on system capabilities) are used as the set point (block 140). At this stage, boost converter 20 controls the voltage limits until the low voltage stage is completed (block 150). In this regard, once the upper voltage limit is honored, boost controller 20 will control switch duty cycle in order to draw the proper current to remain under the upper voltage limit until the end of the low voltage state. During this control, FCS controller 60 and/or microprocessor 40 determine if the voltage limits are being met (block 160). If the limits are not being met, the booster converter adjusts (block 170) the duty cycle and the system returns to the step of block 120 in which a determination if the set points are within the capacity of the boost converter. In block 180, FCS controller 60 and/or microprocessor 40 determines if the low voltage state has completed. If the low voltage state had not completed, the system cycles back to Block 150 where the boost converter 20 continues to control the fuel cell stack voltage. Finally, if the low voltage state has complete, the system exits the low voltage mode (block 190). At this point, boost controller 20 will then return to normal operation of regulation and control of average stack output current (boost input current).

Figure 3:
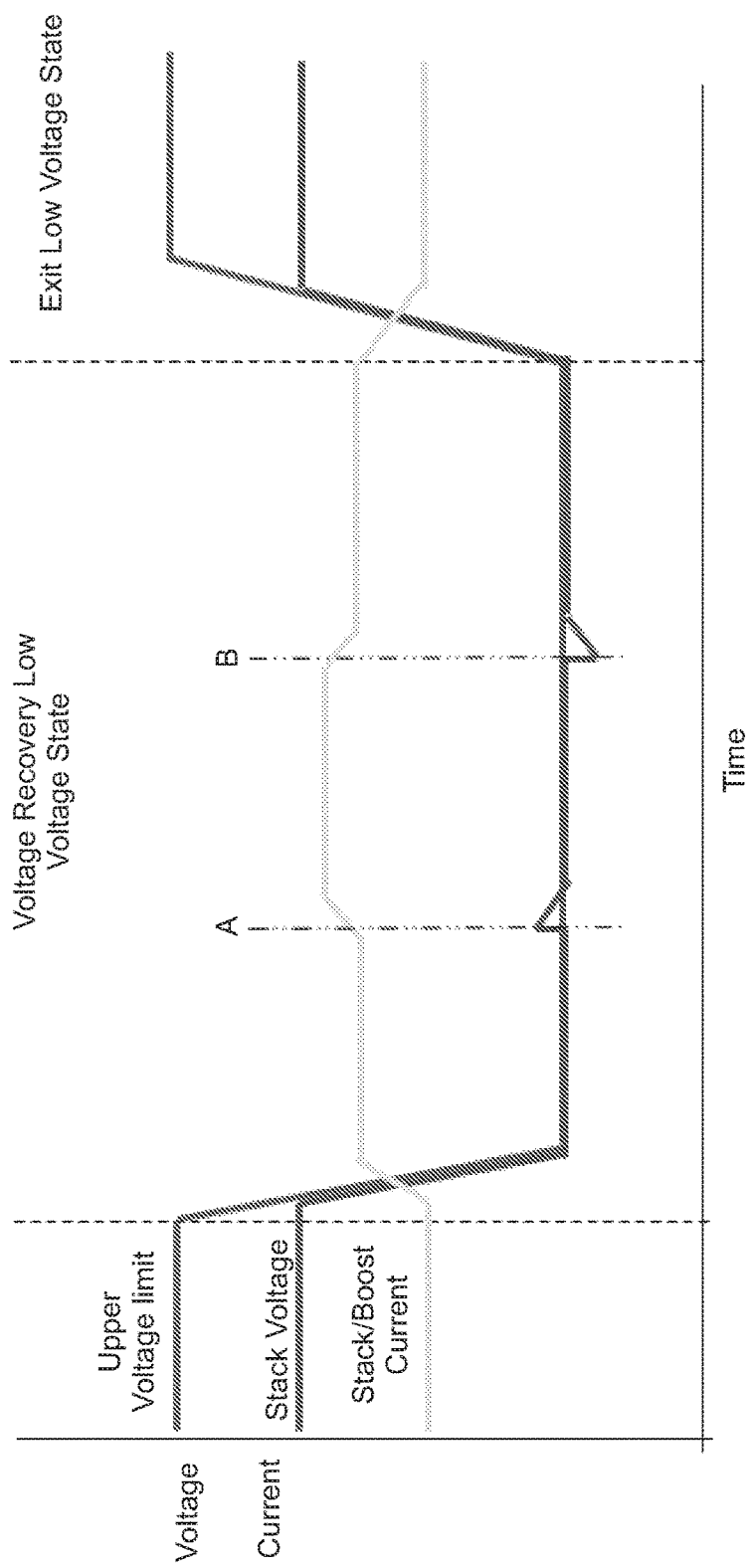
FIG. 3 provides plots of the upper voltage limit, the stack voltage, and the stack boost current versus time.

With reference to FIG. 3, a plot of the upper voltage limit, the stack voltage, and the stack boost current versus time is provided. The wet prep section shows the fuel cell recovery system operating in its normal state, where stack voltage is not limited and the set point is in the current domain. Upon entering the low voltage state of voltage recovery, the upper voltage limit drops and the boost converter begins to limit the stack voltage. This is driven by the increase in the amount of current the boost converter sinks. Line A shows an instance where the stack voltage increases above the voltage limit. The boost converter responds by sinking more current, returning the voltage below the upper limit. Line B shows the opposite, where stack voltage drops. The boost converter will reduce the current it sinks, allowing the voltage to increase. At the end of the low voltage state, the upper voltage limit rises back to its original value, which allows the stack voltage to return to its normal value. This in turn causes the boost converter current to drop, returning the FCS to its normal operating state.

Figure 4:
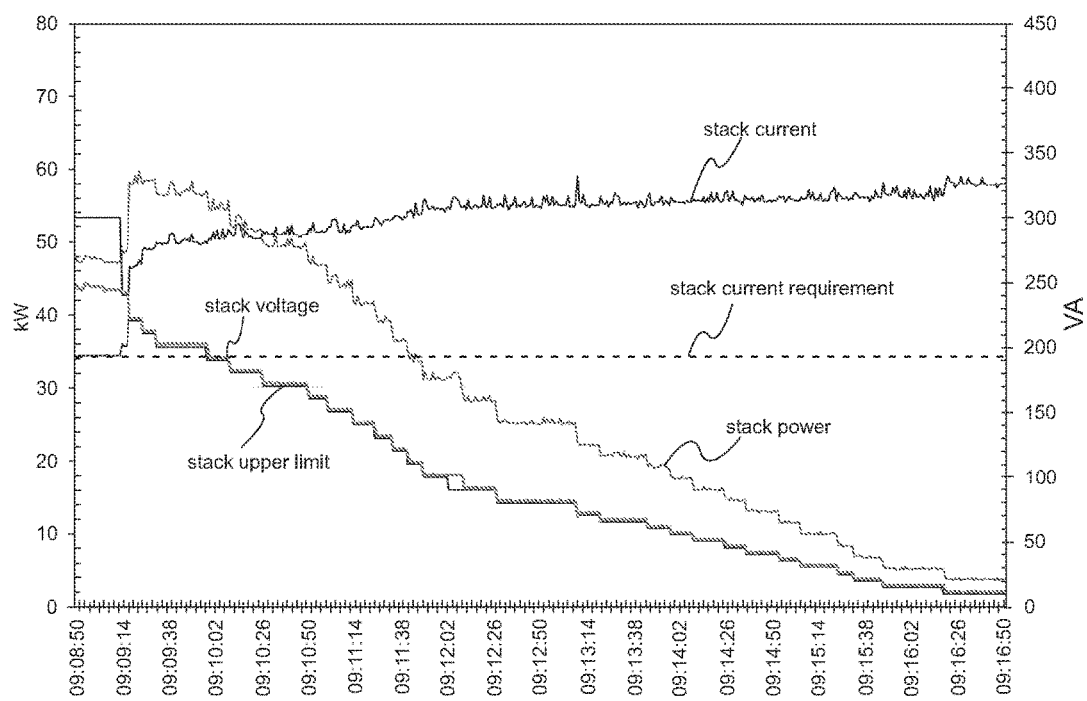
FIG. 4 provides plots of stack voltage, stack power, and stack current versus time is provided.

With reference to FIG. 4, a plot of stack voltage, stack power, and stack current versus time is provided. FIG. 4 also shows the stack current requirement. FIG. 4 illustrates that the stack voltage tracks the upper voltage limit set point under the control of boost converter. The boost converter is observed to successfully bring down the voltage to around 30V, which is an ideal level to recover the reversible voltage loss in a fuel cell stack.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell recovery system comprising:
    a fuel cell stack having a fuel cell stack voltage between fuel cell stack terminals, the fuel cell stack voltage being at a first voltage during normal fuel cell operation;
    a high voltage electrical system operating at a first DC operating voltage, the first DC operating voltage being generally higher than the first voltage of the fuel cell stack;
    a boost converter in electrical connection with the fuel cell stack and the high voltage electrical system, the boost converter including an inductor, a transistor, and a microprocessor that controls whether the transistor is on or off, the boost converter having a normal control mode in which the microprocessor controls the transistor to regulate average stack output current (boost input current) and transfer electrical power from the fuel cell stack to the high voltage electrical system, the boost converter also having a voltage control mode in which the microprocessor controls a duty cycle of the transistor to lower the fuel cell stack voltage to a second voltage that is lower than the first voltage; and
    a FCS controller in communication with the microprocessor of the boost converter that sends control signals instructing the microprocessor to operate the boost converter in the normal control mode or the voltage control mode.

2. The fuel cell recovery system of claim 1 wherein, during the voltage control mode, the boost converter transitions the fuel cell stack voltage to the second voltage by iteratively enforcing upper voltage limit set points that converge to the second voltage, such that the boost converter transitions the fuel cell stack voltage to a value that is lower than a selected upper voltage limit set point.

3. The fuel cell recovery system of claim 2 wherein the upper voltage limit set points are determined by the FCS controller and provided to the boost converter.

4. The fuel cell recovery system of claim 3 wherein if an upper voltage limit set point cannot be achieved by the boost converter, the upper voltage limit set point is set to a value that is achievable by the boost converter.

5. The fuel cell recovery system of claim 2 wherein a voltage change rate limit set point to be used is set by the FCS controller and provided to the boost converter.

6. The fuel cell recovery system of claim 5 wherein if the voltage change rate limit set point cannot be achieved by the boost converter, the voltage change rate limit set point is set to a value that is achievable by the boost converter.

7. The fuel cell recovery system of claim 1 wherein the fuel cell stack includes a plurality of individual fuel cells, each fuel cell operating at a voltage from about 0.6 to 1.22 volts per fuel cell during normal operation.

8. The fuel cell recovery system of claim 7 wherein the fuel cell stack includes from 20 to 350 individual fuel cells.

9. The fuel cell recovery system of claim 7 wherein at the second voltage each fuel cell operates at a voltage from about 0.2 to 0.4 volts per fuel cell.

10. The fuel cell recovery system of claim 1 wherein the boost converter controls current from the fuel cell stack during normal operation.

11. The fuel cell recovery system of claim 1 wherein, during the voltage control mode, the microprocessor of the boost converter controls the duty cycle of the transistor to draw a proper current to remain under an upper voltage limit until completion of the voltage control mode.

12. A fuel cell recovery system comprising:
a fuel cell stack having a fuel cell stack voltage between fuel cell stack terminals, the fuel cell stack voltage being at a first voltage during normal fuel cell operation;
a high voltage electrical system operating at a first DC operating voltage, the first DC operating voltage being higher than the first voltage of the fuel cell stack;
a boost converter in electrical connection with the fuel cell stack and the high voltage electrical system, the boost converter including an inductor, a transistor, and a microprocessor that controls whether the transistor is on or off, the boost converter having a normal control mode to transfer electrical power from the fuel cell stack to the high voltage electrical system during normal fuel cell operation, and further having a voltage control mode to lower the fuel cell stack voltage to a second voltage that is lower than the first voltage, wherein, during the voltage control mode, the microprocessor of the boost converter controls a duty cycle of the transistor and transitions the fuel cell stack voltage to the second voltage by iteratively enforcing upper voltage limit set points that converge to the second voltage such that the fuel cell stack voltage transitions to a value that is lower than a selected upper voltage limit set point; and
a FCS controller in communication with the microprocessor of the boost convertor that sends control signals instructing the microprocessor to change from the normal control mode to the voltage control mode, the FCS controller determining and setting the upper voltage limit set points that are provided to the boost converter.

13. The fuel cell recovery system of claim 12 wherein a voltage change rate limit set point to be used is set by the FCS controller and provided to the boost converter.

14. The fuel cell recovery system of claim 13 wherein if the voltage change rate limit set point cannot be achieved by the boost converter, the voltage change rate limit set point is set to a value that is achievable by the boost converter.

15. The fuel cell recovery system of claim 12 wherein the fuel cell stack includes a plurality of individual fuel cells, each fuel cell operating at a voltage from about 0.6 to 1.22 volts per fuel cell during normal operation.

16. The fuel cell recovery system of claim 15 wherein at the second voltage each fuel cell operates at a voltage from about 0.1 to 0.4 volts per fuel cell.

17. The fuel cell recovery system of claim 15 wherein the boost converter controls current from the fuel cell stack during normal operation.

18. The fuel cell recovery system of claim 15 wherein, during the voltage control mode, the boost converter controls the duty cycle of the transistor to draw a proper current to remain under an upper voltage limit until completion of the voltage control mode.

* * * * *